US009482235B2

(12) United States Patent
Small et al.

(10) Patent No.: US 9,482,235 B2
(45) Date of Patent: Nov. 1, 2016

(54) GAS COMPRESSOR MAGNETIC COUPLER (75) Inventors: Robert Small, Williamsville, NY (US);
Robert Kolodziej, Varysburg, NY (US);
Edward Czechowski, Orchard Park, NY (US); Nathan Vetter, Depew, NY (US)

(73) Assignee: Ingersoll-Rand Company, Davidson, NC (US)

( * ) Notice: Subject to any disclaimer, the term of this patent is extended or adjusted under 35 U.S.C. 154(b) by 618 days.

(21) Appl. No.: 12/992,076

(22) PCT Filed: Apr. 29, 2009

(86) PCT No.: PCT/US2009/042035
§ 371 (c)(1),
(2), (4) Date: Nov. 10, 2010

(87) PCT Pub. No.: WO2009/154880
PCT Pub. Date: Dec. 23, 2009

(65) Prior Publication Data
US 2011/0076136 A1   Mar. 31, 2011

Related U.S. Application Data (60) Provisional application No. 61/074,407, filed on Jun. 20, 2008.

(51) Int. Cl.
F04D 25/02 (2006.01)
H02K 49/10 (2006.01)
F04D 25/16 (2006.01)

(52) U.S. Cl.
CPC ........... F04D 25/026 (2013.01); F04D 25/163 (2013.01); H02K 49/104 (2013.01); H02K 49/106 (2013.01); H02K 49/108 (2013.01)

(58) Field of Classification Search
CPC .. F04D 25/026; F04D 25/082; F04D 25/163; F04D 13/0606; F04D 13/14; H02K 49/10; H02K 49/102; H02K 49/104; H02K 49/106; H02K 49/108
USPC ........... 415/122.1, 124.2; 417/223, 362, 420, 417/423.6; 418/69; 285/9.1; 310/103; 464/29

See application file for complete search history.

(56) References Cited

U.S. PATENT DOCUMENTS 3,378,710 A * 4/1968 Martin, Jr. ..................... 310/104
3,826,938 A * 7/1974 Filer .............................. 310/104

(Continued)

FOREIGN PATENT DOCUMENTS

DE       3127893      2/1983
EP       0025562      3/1981

(Continued)

OTHER PUBLICATIONS

KTR Catalog; MINEX-S Magnetic Coupling; pp. 192-196.

(Continued)

Primary Examiner — Devon Kramer
Assistant Examiner — Joseph Herrmann
(74) Attorney, Agent, or Firm — Taft Stettinius & Hollister LLP (57) ABSTRACT Provided in some embodiments is a gas compression system that includes a gas compressor having a drive shaft, an impeller drive shaft magnetically coupled to the drive shaft, and a shroud disposed between the drive shaft and the impeller drive shaft. In other embodiments provided is method that includes magnetically coupling a first drive shaft to a second drive shaft, receiving a rotational torque at the first drive shaft, transmitting the rotational torque from the first drive shaft to the second drive shaft via the magnetic coupling, and rotating a gas compressor impeller coupled to the second drive shaft.

23 Claims, 8 Drawing Sheets (56) References Cited

U.S. PATENT DOCUMENTS

| | | | |
|---|---|---|---|
| 4,065,234 A * | 12/1977 | Yoshiyuki et al. | 417/420 |
| 4,120,618 A * | 10/1978 | Klaus | 417/420 |
| 4,197,474 A | 4/1980 | Honigsbaum | |
| 4,219,306 A * | 8/1980 | Fujino et al. | 415/62 |
| 4,277,707 A * | 7/1981 | Silver et al. | 310/104 |
| 4,850,821 A * | 7/1989 | Sakai | 417/420 |
| 4,896,064 A * | 1/1990 | Taiani | A63B 21/0053 310/104 |
| 5,013,949 A * | 5/1991 | Mabe, Jr. | 310/83 |
| 5,292,284 A * | 3/1994 | Denk et al. | 464/29 |
| 5,844,340 A | 12/1998 | Noda | |
| 6,132,188 A | 10/2000 | Brunee | |
| 6,149,405 A * | 11/2000 | Abe et al. | 417/420 |
| 6,205,906 B1 | 3/2001 | Suzuki et al. | |
| 6,217,298 B1 * | 4/2001 | Klaui | 417/420 |
| 6,417,591 B1 * | 7/2002 | Saito et al. | 310/104 |
| 6,499,907 B1 | 12/2002 | Baur | |
| 6,677,410 B2 | 1/2004 | Williams | |
| 6,692,224 B2 * | 2/2004 | Miura et al. | 415/66 |
| 6,841,910 B2 * | 1/2005 | Gery | 310/103 |
| 6,851,938 B2 | 2/2005 | Ding et al. | |
| 7,029,246 B2 * | 4/2006 | Miller et al. | 417/420 |
| 7,073,775 B2 | 7/2006 | Kabir et al. | |
| 7,086,778 B2 * | 8/2006 | Terentiev | 366/273 |
| 7,425,121 B2 * | 9/2008 | Wood et al. | 418/259 |
| 7,439,702 B2 | 10/2008 | Smith et al. | |
| 7,670,118 B2 * | 3/2010 | Sato | 417/420 |
| 7,690,293 B2 | 4/2010 | Bensley et al. | |
| 7,871,254 B2 * | 1/2011 | Ito | 418/55.3 |
| 2003/0044285 A1 | 3/2003 | Ding et al. | |
| 2004/0105767 A1 * | 6/2004 | Black et al. | 417/420 |
| 2004/0265151 A1 * | 12/2004 | Bertram | 417/420 |
| 2005/0206260 A1 * | 9/2005 | Akiyama | 310/104 |
| 2006/0144387 A1 * | 7/2006 | Sato | 126/110 R |
| 2007/0108934 A1 * | 5/2007 | Smith et al. | 318/701 |
| 2009/0062020 A1 * | 3/2009 | Edwards et al. | 464/89 |
| 2011/0038737 A1 | 2/2011 | Conry et al. | |

FOREIGN PATENT DOCUMENTS

| | | | | |
|---|---|---|---|---|
| EP | 1310677 | | 5/2003 | |
| EP | 1420164 | | 5/2004 | |
| EP | 1596071 | | 11/2005 | |
| EP | 1693570 | | 8/2006 | |
| GB | 2347716 A | * | 9/2000 | F04D 13/14 |
| WO | WO2009154880 A1 | * | 12/2009 | F04D 25/02 |

OTHER PUBLICATIONS

Lesson Learned From Natural Gas STAR Partners; Article Entitled Replacing Wet Seals with Dry Seals in Centrifugal Compressors; Nov. 2003; pp. 1-12.

Dexter Magnetic Technologies; Magnetic Couplings; http://www.dextermag.com/products_magneticapplications.aspx?id=110; printed Feb. 4, 2008; 2 pages.

Dexter Magnetic Technologies; Permanent Magnet Materials; http://www.dextermag.com/products_magneticmaterials.aspx?id=61&; printed Feb. 4, 2008; 1 page.

GB Examination Report for Application No. GB1104644.8, dated Nov. 13, 2012.

SG Written Opinion for Application No. 201101082-4, dated Jan. 19, 2012.

PCT Search Report and Written Opinion for PCT/US2009/052385 mailed Apr. 12, 2009.

European Patent Office, International Search Report & Written Opinion issued in corresponding Application No. PCT/US2009/042035, mailed Oct. 6, 2009, 8 pp.

Canadian Patent Office, Examination Report issued in corresponding Application No. 2,726,294, mailed Feb. 17, 2016, 4 pp.

* cited by examiner

GAS COMPRESSOR MAGNETIC COUPLER

CROSS-REFERENCE TO RELATED APPLICATIONS

This application claims priority to and benefit of PCT Patent Application No. PCT/US2009/042035, entitled "Gas Compressor Magnetic Coupler," filed Apr. 29, 2009, which is herein incorporated by reference in its entirety, and which claims priority to and benefit of U.S. Provisional Patent Application No. 61/074,407, entitled "Gas Compressor Magnetic Coupler", filed on Jun. 20, 2008, which is herein incorporated by reference in its entirety.

FIELD OF THE INVENTION

This invention relates to gas compressors. More particularly, the present invention relates to a gas compressor employing a magnetic coupler.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Gas compressors are used in a wide variety of industries including aerospace, automotive, oil and gas, power generation, food and beverage, pharmaceuticals, water treatment, and the like. The gas may include air, nitrogen, oxygen, natural gas, or any other type of gas. Gas compressor systems generally include devices that increase the pressure of a gas by decreasing (e.g., compressing) its volume. Certain types of gas compressors employ one or more mechanisms that employ a rotational torque to compress an incoming gas. For instance, in a centrifugal gas compressor system, a gas is drawn into a housing through an inlet, the gas is compressed by a rotating impeller, and the gas is expelled from the housing. Often, the impeller or other rotating mechanism is driven by a rotating drive shaft that extends into the housing. In such a system, one or more seals are typically disposed around the drive shaft to reduce the amount of compressed gas that leaks around the drive shaft and out of the housing. Some compressor systems employ a wet seal and/or a dry-face seal for this purpose. Wet seals are common, but typically allow more gas to pass than a dry-face seal employed in the same environment. Dry-face seals are often complex in design and employ an equally complex control system. However, even a dry-face seal is susceptible to gas leaks and typically creates an additional cost relating to installation, operation, and maintenance of the seal.

Unfortunately, gas that leaks past the seal and out of the housing is generally undesirable for several reasons. Gas leaking past the seal may not be recovered, resulting in a net decrease in the product output by the compressor. In other words, gas that leaks by the seal may be unrecoverable or cost a great deal to recover. Further, gas that leaks past the seal may produce other safety concerns that lead to additional procedures and devices in the compression process. For example, the gas compressor may employ additional seals and/or control systems to capture the gas, scrub (e.g., clean) the gas, flash (burn off) the gas, or the like. This can also add to the cost of installing, operating, and maintaining the gas compressor.

BRIEF DESCRIPTION OF THE DRAWINGS

Various features, aspects, and advantages of the present invention will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments discussed below include a system and method that addresses one or more of the above-mentioned inadequacies of a conventional compressor system. In certain embodiments, a gas compressor system includes a drive shaft that employs a magnetic coupler to transmit torque from a first portion of the drive shaft to a second portion of the drive shaft that is coupled to a gas impeller. In some embodiments, the magnetic coupler is disposed at an interface between a drive side of the compressor and a driven side of the compressor, and the magnetic coupler provides a hermetic seal that helps to prevent gas from escaping where the drive shaft would otherwise pass through the housing. For example, in some embodiments, the magnetic coupler includes a containment shroud disposed in a drive shaft bore in the housing, where the magnetic coupler is disposed between a rotor coupled to the first portion of the drive shaft and a complementary rotor coupled to the second portion of the drive shaft. Thus, in operation, rotational torque is transferred from the first portion of the drive shaft to the second portion of the drive shaft and the impeller via the magnetic coupler and there is no appreciable loss (e.g., zero-loss) of gas from the housing via the drive shaft bore. In certain embodiments, any number of magnetic couplers (e.g., 1, 2, 3, 4, 5, or more) may be used to transfer rotational torque between components in series or in parallel with one another. Moreover, any number and configuration of bearings may be disposed about the various rotational components in symmetrical or asymmetrical configurations about the magnetic couplers (e.g., equal or different number of bearings on opposite sides of magnetic couplers). Before discussing embodiments of the present technique and system, it may be beneficial to describe a compressor system that may employ such a system.

Figure 1:
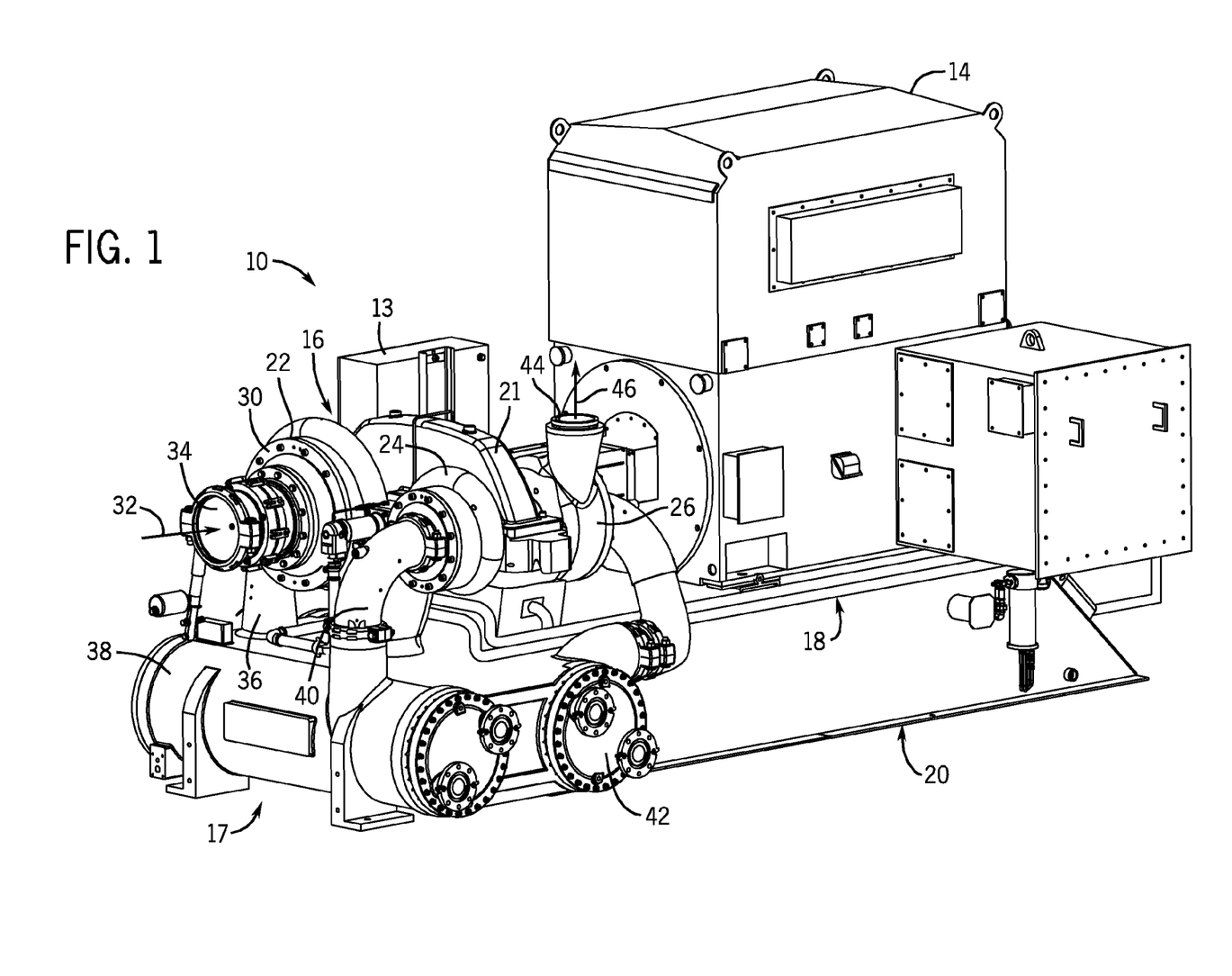
FIG. 1 is a perspective view of an exemplary compressor system having a magnetic coupling system in accordance with an embodiment of the present technique.

FIG. 1 illustrates an embodiment of a compressor system 10 employing a magnetic coupler 12 (see FIG. 2) in accordance with aspects of the present technique. The compressor system 10 is generally configured to compress gas in various applications. For example, the compressor system 10 may be employed in applications relating to the automotive industries, electronics industries, aerospace industries, oil and gas industries, power generation industries, petrochemical industries, and the like.

Generally the compressor system 10 includes one or more of a reciprocating, rotary, axial, and/or a centrifugal gas compressor that is configured to increase the pressure of (e.g., compress) incoming gas. In the illustrated embodiment, the compressor system 10 includes a centrifugal compressor. More specifically, the depicted embodiment includes a Turbo-Air 9000 manufactured by Cameron of Houston, Tex. In some embodiments, the compressor system 10 includes a power rating of approximately 150 to approximately 3,000 horsepower (HP), discharge pressures of approximately 80 to 150 pounds per square inch (PSIG) and an output capacity of approximately 600 to 15,000 cubic feet per minute (CFM). It will be appreciated that, although, the illustrated embodiment includes only one of many compressor arrangements that can employ the magnetic coupler 12, other embodiments of the compressor system 10 may include various compressor arrangements and operational parameters. For instance, the compressor system 10 may include a different type of compressor, a lower horsepower rating suitable for applications having a lower output capacity and/or lower pressure differentials, a higher horsepower rating suitable for applications having a higher output capacity and/or higher pressure differentials, and so forth.

In the illustrated embodiment, the compressor system 10 includes a control panel 13, a drive unit 14, a compressor unit 16, an intercooler 17, a lubrication system 18, and a common base 20. The common base 20 generally provides for simplified assembly and installation of the compressor system 10. For example, the control panel 13, the drive unit 14, the compressor unit 16, intercooler 17, and the lubrication system 18 are coupled to the common base 20. This enables installation and assembly of the compressor system 10 as modular components that are pre-assembled and/or assembled on site.

The control panel 13 typically includes various devices and controls configured to monitor and regulate operation of the compressor system 10. For example, in one embodiment, the control panel 13 includes a switch to control system power, and/or numerous devices (e.g., liquid crystal displays and/or light emitting diodes) indicative of operating parameters of the compressor system 10. In other embodiments, the control panel 13 includes advanced functionality, such as a programmable logic controller (PLC) or the like.

The drive unit 14 generally includes a device configured to provide motive power to the compressor system 10. The drive unit 14 is employed to provide energy, typically in the form of a rotating drive unit shaft, which is used to compress the incoming gas. Generally, the rotating drive unit shaft is coupled to the inner workings of the compressor unit 16, and rotation of the drive unit shaft is translated into rotation of an impeller that compresses the incoming gas. In the illustrated embodiment, the drive unit 14 includes an electric motor that is configured to provide rotational torque to the drive unit shaft. In other embodiments, the drive unit 14 may include other motive devices, such as a compression ignition (e.g., diesel) engine, a spark ignition (e.g., internal gas combustion) engine, a gas turbine engine, or the like.

The compressor unit 16 typically includes a gearbox 21 that is coupled to the drive unit shaft. The gearbox 21 generally includes various mechanisms that are employed to distribute the motive power from the drive unit 14 (e.g., rotation of the drive unit shaft) to impellers of the compressor stages. For instance, in operation of the system 10, rotation of the drive unit shaft is delivered via internal gearing to the various impellers of a first compressor stage 22, a second compressor stage 24, and a third compressor stage 26. In the illustrated embodiment, the internal gearing of the gear box 21 typically includes a bull gear coupled to a drive shaft that delivers rotational torque to the impeller. This and other aspects of the internal workings of the compressor unit 16 are discussed in greater detail below with regard to FIGS. 2 and 3.

It will be appreciated that such a system (e.g., where a drive unit 14 that is indirectly coupled to the drive shaft that delivers rotational torque to the impeller) is generally referred to as an indirect drive system. In certain embodiments, the indirect drive system may include one or more gears (e.g., gearbox 21), a clutch, a transmission, a belt drive (e.g., belt and pulleys), or any other indirect coupling technique. However, another embodiment of the compressor system 10, although not illustrated here, may include a direct drive system. In an embodiment employing the direct drive system, the gear box 21 and the drive unit 14 are essentially integrated into the compressor unit 16 to provide torque directly to the drive shaft. For example, in a direct drive system, a motive device (e.g., an electric motor) surrounds the drive shaft, thereby directly (e.g., without intermediate gearing) imparting a torque on the drive shaft. Accordingly, in an embodiment employing the direct drive system, multiple electric motors can be employed to drive one or more drive shafts and impellers in each stage of the compressor unit 16. However, any type of indirect drive or direct drive system may be used with the magnetic coupler in certain embodiments. In another embodiment, a magnetic coupler may be used to couple one or more drive units 14 to the drive shaft.

In FIG. 1, the gearbox 21 includes features that provide for increased reliability and simplified maintenance of the system 10. For example, the gearbox 21 includes an integrally cast multi-stage design for enhanced performance. In other words, the gearbox 21 includes a singe casting including all three scrolls helping to reduce the assembly and maintenance concerns typically associated with systems 10. Further, the gearbox 21 includes a horizontally split cover for easy removal and inspection of components disposed internal to the gearbox 21.

As discussed briefly above, the compressor unit 16 generally includes one or more stages that compress the incoming gas in series. For example, in the illustrated embodiment, the compressor unit 16 includes three compression stages (e.g., a three stage compressor), including the first stage compressor 22, the second stage compressor 24, and the third stage compressor 26. Each of the compressor stages 22, 24, and 26 includes a centrifugal scroll that includes a housing encompassing one or more gas impellers. In operation, incoming gas is sequentially passed into each of the compressor stages 22, 24, and 26 before being discharged at an elevated pressure.

Operation of the system 10 includes drawing a gas into the first stage compressor 22 via a compressor inlet 30 and in the direction of arrow 32. As illustrated, the compressor unit 16 also includes a guide vane 34. The guide vane 34 includes vanes and other mechanisms to direct the flow of the gas as it enters the first compressor stage 22. For example, the guide vane 34 typically imparts a whirling motion to the inlet air flow in the same direction as the impeller of the first compressor stage 22, thereby helping to reduce the work input at the impeller to compress the incoming gas.

After the gas is drawn into the system 10 via the compressor inlet 30, the first stage compressor 22 compresses and discharge the compressed gas via a first duct 36. The first duct 36 routes the compressed gas into a first stage 38 of the intercooler 17. The compressed gas expelled from the first compressor stage 22 is directed through the first stage intercooler 38 and is discharged from the intercooler 17 via a second duct 40.

Generally, each stage of the intercooler 17 includes a heat exchange system to cool the compressed gas. In one embodiment, intercooler 17 includes a water-in-tube design that effectively removes heat from the compressed gas as it passes over heat exchanging elements internal to the intercooler 17. An intercooler stage is typically provided after each compressor stage to reduce the gas temperature and to improve the efficiency of each subsequent compression stage. For example, in the illustrated embodiment, the second duct 40 routes the compressed gas into the second compressor stage 24 and a second stage 42 of the intercooler 17 before routing the gas to the third compressor stage 26.

After the third stage compresses the gas, the compressed gas is discharged via a compressor discharge 44 in the direction of arrow 46. In the illustrated embodiment, the compressed gas is routed from the third stage compressor 26 to the discharge 44 without an intermediate cooling step (e.g., passing through a third intercooler stage). However, other embodiments of the compressor system 10 may include a third intercooler stage or similar device configured to cool the compressed gas as it exits the third compressor stage 26. Further, additional ducts may be coupled to the discharge 44 to effectively route the compressed gas for use in a desired application (e.g., drying applications).

As discussed previously, each of the compressor stages 22, 24, and 26 generally includes one or more impellers that are located in a housing and are driven by rotation of a drive shaft. In certain applications, the drive shaft may extend though a drive shaft bore in the housing. Unfortunately, in a system that employs a drive shaft that extends through the housing, gas may leak from the housing via the drive shaft bore. This is generally attributed to seals that do not provide a complete seal between the drive shaft and the drive shaft bore. As discussed previously, gas that leaks past the seal and out of the housing is generally undesirable for several reasons. Gas leaking past the seal may not be recovered, resulting in a net decrease in the product output by the compressor. Further, gas that leaks past the seal may produce other safety concerns that lead to additional procedures and devices in the compression process. Disclosed below are embodiments of the compressor system 10 that employ a magnetic coupler to provide rotational torque to the various impellers of the compressor system 10, while maintaining a seal of the drive shaft bore that helps to block any gas from leaking out of the housing.

Figure 2:
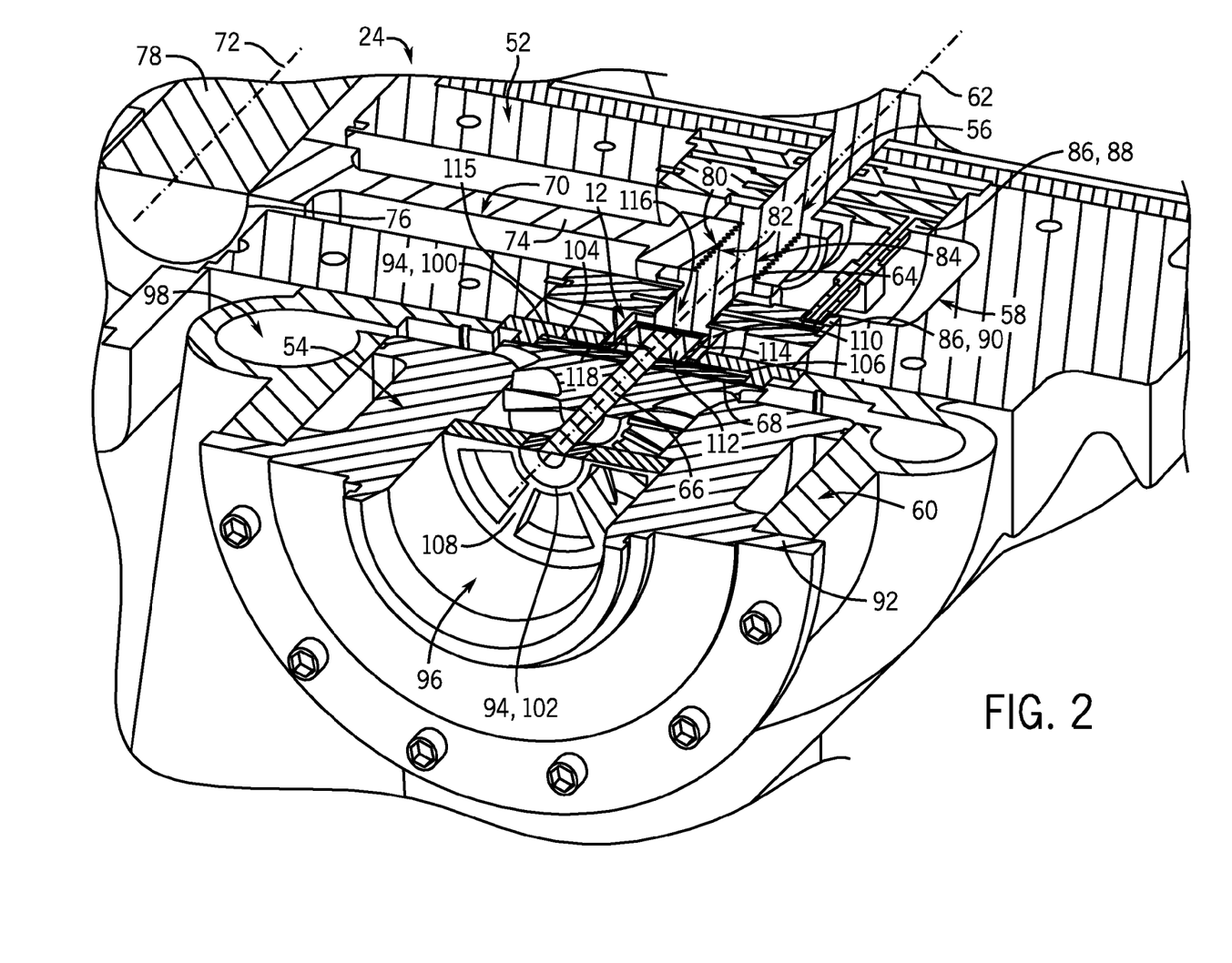
FIG. 2 is a cutaway top perspective view section of an embodiment of a second stage of the compressor system of FIG. 1.
Figure 3:
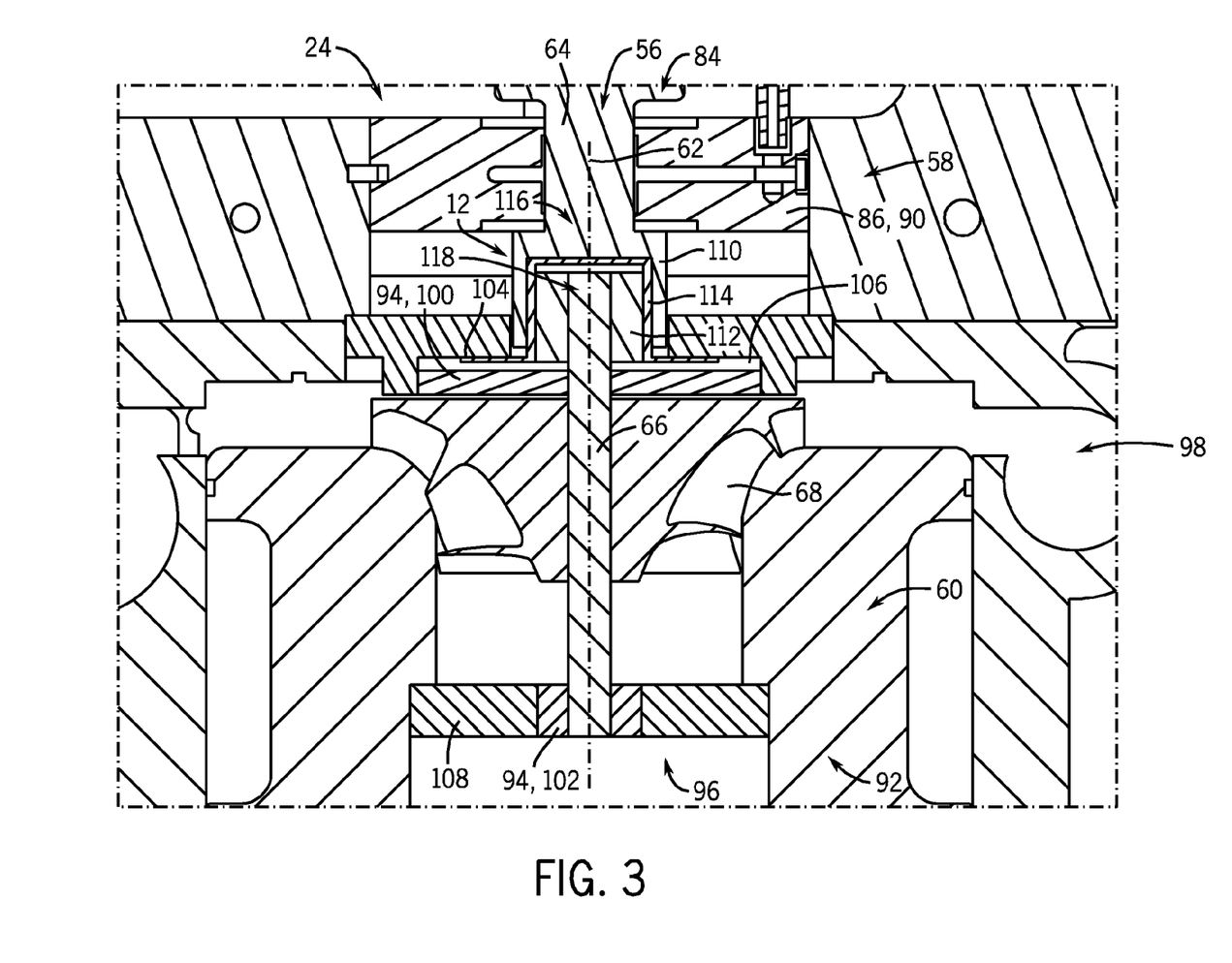
FIG. 3 is a top cross-sectional view of an embodiment of the second stage of the compressor of FIG. 1.

FIGS. 2 and 3 illustrate one embodiment of the compressor system 10 in accordance with aspects of the present technique. More particularly, FIG. 2 illustrates a cutaway top perspective view of the second stage 24 of the compressor system 10, and FIG. 3 illustrates a top cross-sectional view of the second stage 24. Although the following embodiments are discussed with regard to the second stage 24, the embodiments may be employed with any one of the stages or similar components of the gas compressor system 10. As is depicted in the illustrated embodiment, the stage 24 includes a drive system 52, a compressor scroll 54, and the magnetic coupler 12. The magnetic coupler 12 is arranged to provide for the transfer of torque across a drive shaft 56 that extends from a drive side 58 of the stage 24 to a driven side 60 of the stage 24, and that is oriented along a drive axis 62. The drive side 58 may be defined as a side of the stage 24 that is configured to deliver a motive power (e.g., a rotational torque), whereas the driven side 60 may be defined as a side of the stage 24 that is configured to receive the motive power (e.g., the side including an impeller or similar compressive device). For example, in the illustrated embodiment, the drive shaft 56 includes a first drive shaft portion 64 (e.g., a pinion drive shaft) that is coupled to a second drive shaft portion 66 (e.g., an impeller drive shaft) via the magnetic coupler 12. However, the first and second drive shaft portions 64 and 66 are physically/mechanically separate from one another. In other words, the portions 64 and 66 are not physically/mechanically connected with one another. The only connection between the portions 64 and 66 is via magnetism. Accordingly, rotational torque applied to the first drive shaft portion 64 drives the second drive shaft portion 66 via rotational torque transferred by the magnetic coupler 12. As is discussed in further detail below, the second drive shaft portion 66 provides a rotational torque to an impeller 68 of the compressor scroll 54.

Rotational torque is generally provided to the drive shaft 56 via the drive unit 14, as discussed briefly above. In the illustrated embodiment, the drive system 52 includes an indirect drive system wherein the rotational torque is delivered to the drive shaft 56 indirectly (e.g., via gearing and/or intermediate mechanical devices). For example, in the illustrated embodiment, the drive shaft 56 is driven by a bull gear 70 that rotates about a bull gear axis 72. The bull gear 70 includes a disc-shaped body 74 having a central bore, which is 76 aligned along the bull gear axis 72 and is coupleable to a drive unit shaft 78 that extends from the drive unit 14. The bull gear 70 also includes gearing 80, which extends about its circumference and that engages complementary gearing 82 located in a drive region 84 of the drive shaft 56. Accordingly, as the drive unit shaft 78 is rotated, the bull gear 70 is rotated, and rotational torque is transferred to the drive shaft 56 via the gearing 80 and the complementary gearing 82. Further, in the illustrated embodiment, the first drive shaft portion 64 is supported by a plurality of bearings 86. More specifically, a first bearing 88 is located on one side of the drive region 84 and a second bearing 90 is located on an opposite side of the drive region 84. In other words, the bearings 86 straddle the drive region 84. The bearings 86 may include any type of bearing capable of providing radial and axial support of the first portion of the drive shaft 56. For example, in certain embodiments, the bearings 86 include oil-filled bearings, magnetic bearings, ceramic bearings, or the like.

In an embodiment that employs a direct drive system, discussed briefly above, the rotational torque may be applied directly to the first drive shaft portion 64. In other words, in an embodiment wherein the drive system 52 does not employ intermediate gearing to transfer torque to the drive shaft 56, but, instead, delivers torque directly to the drive region 84 of the drive shaft 56, the drive system 52 employs a motive device, such as an electric motor, located proximate the drive shaft 56. For example, in one embodiment, the drive system 52 includes an electric motor disposed around the drive region of the drive shaft 56. In an embodiment, the electric motor includes a coil disposed around an armature coupled to the drive shaft 56. Accordingly, energizing the electric motor generates a direct rotational torque on the drive shaft. Other embodiments can include similar arrangements employing alternating current (AC) motors, brushed direct current (DC) motors, brushless DC motors, and the like. The advantages of a direct drive system include the ability to vary the speed of multiple drive shafts independently and the ability to reach high speeds, including those in excess of 100,000 rpm. However, any type of direct or indirect drive system may be used with the magnetic coupler in certain embodiments.

Turning now to the driven side 60 of the stage 24, the compressor scroll 54 includes components configured to compress the incoming gas. In the illustrated embodiment, the compressor scroll 54 includes a housing 92, an impeller 68, the second drive shaft portion 66 (e.g., the impeller drive shaft), and bearings 94. The housing 92 includes an inlet 96 and a compression chamber 98 that generally encloses the impeller 68. The illustrated impeller 68 includes a closed face impeller, although an open face impeller can be employed in other embodiments.

In operation, gas enters the compressor scroll 54 via the inlet 96, and the impeller 68 compresses the incoming gas. In the illustrated embodiment (e.g., including a centrifugal compressor), the impeller 68 forces the gas radially outward, thereby compressing the gas within the compression chamber 98 of the housing 92. In operation, the impeller 68 may be rotated up to and in excess of 75,000 revolutions per minute (rpm). For example, in one embodiment, the operating range of the impeller 68 is from about 15,000 rpm to about 75,000 rpm. In other embodiments, the operating range may be greater or lesser, e.g., 0 to 150,000 rpm, 0 to 50,000 rpm, and so forth. The speed of the impeller 68 may be varied based on the volume and the pressure differential of the incoming gas. The compressed gas is discharged from the housing 92 via an outlet (not shown) in the housing.

As further illustrated in the embodiment of FIG. 2, the impeller drive shaft 66 is supported by the bearings 94. In the illustrated embodiment, the bearings 94 include a first bearing 100 located behind the impeller 68 (e.g., between the impeller 68 and the drive side 58 of the stage 24) and a second bearing 102 located in front of the impeller 68 (e.g., between the impeller 68 and the inlet 96 of the stage 24). The first bearing 100 is seated in a recess 104 that is located behind the impeller 68 and integral to a wall 106 of the housing 92. The second bearing 102 is supported by a bearing support 108 disposed in a channel defining the inlet 96. More specifically, the bearing support 108 includes a rigid structure that is configured to align the first bearing 100 and the impeller drive shaft 66 with the drive axis 62. The bearings 94 may include any type bearing capable of providing radial and axial support of the impeller drive shaft 66. For example, in certain embodiments, the bearings 94 include oil-filled bearings, magnetic bearings, ceramic bearings, or the like.

As discussed previously, the magnetic coupler 12 is configured to transmit a rotational torque from the first drive shaft portion 64 (e.g., the pinion drive shaft) to the second drive shaft portion 66 (e.g., the impeller drive shaft). In certain embodiments, the magnetic coupler 12 may be used with a shaft and impeller with any type of drive system. In one embodiment, the magnetic coupler is configured to transmit the rotational torque between the first drive shaft portion 64 and the second drive shaft portion 66 without any mechanical/physical connection between the shaft portions 64 and 66. The magnetic coupler 12 includes an external rotor 110, an internal rotor 112 and a containment shroud 114. In operation, the external rotor 110 and the internal rotor 112 are magnetically coupled to one another, such that at least a portion of the rotational torque acting on the pinion drive shaft 64 and external rotor 110 is magnetically transferred to the internal rotor 112 and the impeller drive shaft 66. Accordingly, torque applied to the pinion drive shaft 64 imparts a torque on the impeller drive shaft 66, resulting in rotation of the impeller drive shaft 66 and the impeller 68. In the illustrated embodiment, the external rotor 110 is coupled to a driving end 116 of the pinion drive shaft 64, and the internal rotor 112 is coupled to a driven end 118 of the impeller drive shaft 66. However, in other embodiments, the location of the rotors 110 and 112 can be swapped. For example, the external rotor 110 may be disposed on the impeller drive shaft 66 and the internal rotor 112 may be disposed on the pinion drive shaft 64, in one embodiment. Further, the magnetic coupler 12 is disposed in a drive shaft bore 115 that extends between the drive side 58 and the driven side 60 of the stage 24. Generally, the drive shaft bore 58 includes a cylindrical passage aligned with the drive shaft axis 62.

Figure 4:
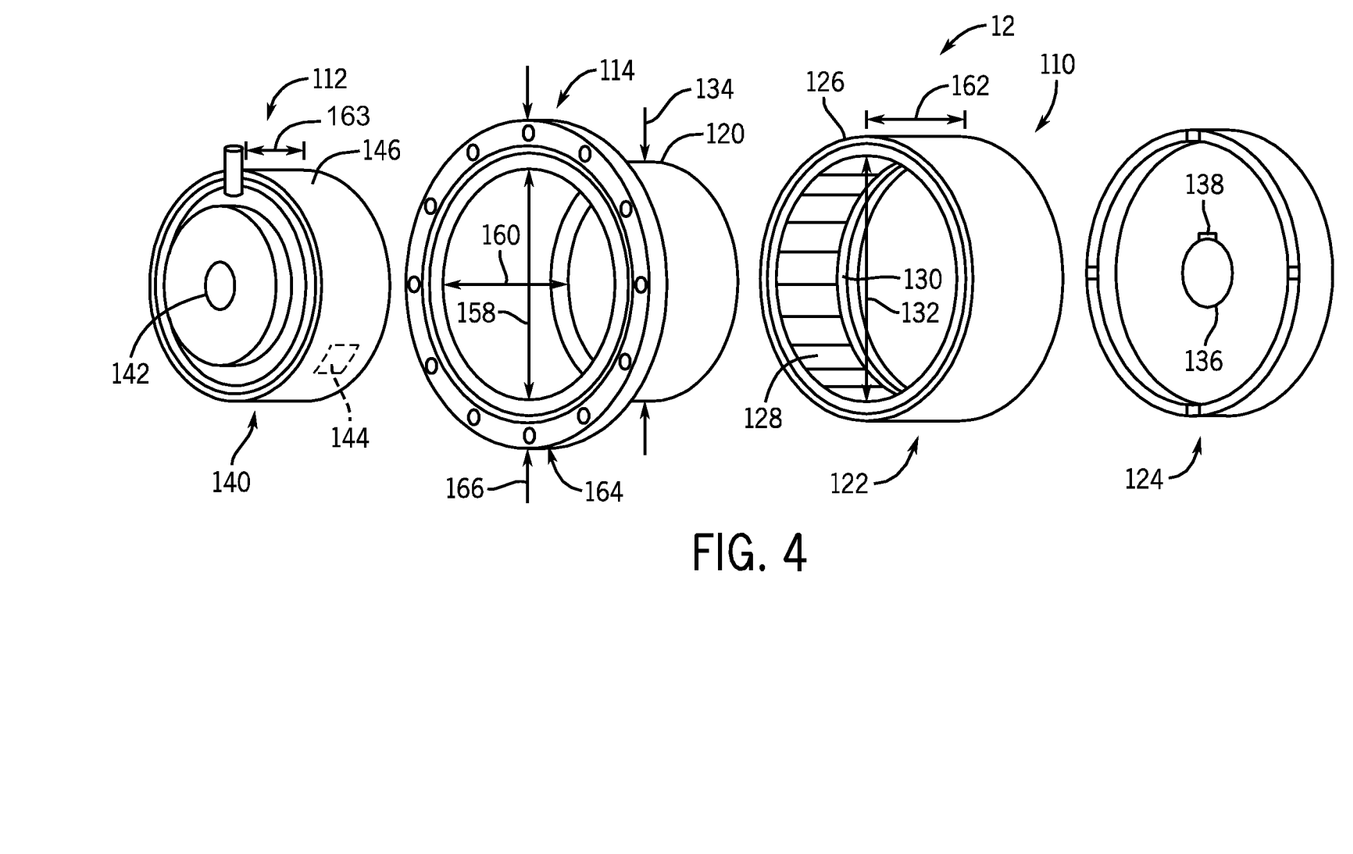
FIG. 4 is an exploded view of an embodiment of a magnetic coupler.

FIG. 4 illustrates an exploded view of one embodiment of the magnetic coupler 12 independent of the drive shaft 56. As discussed above, the magnetic coupler 12 includes the external rotor 110, the internal rotor 112 and the containment shroud 114. When assembled, the external rotor 110 is disposed around a protrusion 120 of the containment shroud 114, and the internal rotor 112 is nested within the protrusion 120 of the containment shroud 114. Accordingly, the magnetic coupler 12 includes the internal rotor 112 coaxial with and nested inside of the external rotor 110 in one embodiment. In other words, the internal rotor 112 and the external rotor 112 are arranged concentrically with the internal rotor 112 inside the external rotor 110. In other embodiments, the magnetic coupler 12 may be arranged with axial components facing one another, rather than any nested or coaxial arrangement. In other words, magnets may be arranged in coaxial and/or axial arrangements on opposite sides of a sealed wall, such that torque is transmitted magnetically through the wall while maintaining a complete seal between opposite sides.

As depicted in the illustrated embodiment, the external rotor 110 includes a body 122 and an end cap 124. The body 122 includes a hollow cylindrical shaped ring 126 having a plurality of magnetic devices 128 disposed about an internal surface 130 of the ring 126. The internal diameter 132 of the ring 126, including the plurality of magnetic devices 128, is slightly larger than an external diameter 134 of the protrusion 120 of the containment shroud 114, such that the external rotor 110 can slide of being slid over the protrusion 120 of the containment shroud 114.

The magnetic devices 128 generally include permanent magnets or similar electro-magnetic devices that are capable of generating a magnetic field to magnetically couple the external rotor 110 to complementary magnetic devices of the internal rotor 112. In one embodiment, the magnetic devices 128 include one or more hub magnets disposed about the interior of the body 122. The hub magnets generally include permanent magnets that generate a static (e.g., passive) magnetic field. For example, in one embodiment, the permanent magnets include rare-earth magnets, such as samarium-cobalt (SmCo17), neodymium ferric boron (NdFeB), or the like. In another embodiment, the magnetic devices 128 include active magnetic devices. In one such embodiment, the magnetic device 128 is composed of conductive coils, or similar devices, that can be energized to generate a magnetic field. Accordingly, the external rotor 110 may include electrical circuitry coupled to a power supply and/or a control system that is capable of regulating the current flowing through the coils, and, thus, regulating the magnetic field generated by the external rotor 110. The ability to regulate the magnetic field provides the system 10 with an ability to enable and/or disable the magnetic coupler 12 as desired. As is discussed in further detail below, the use of permanent magnets is generally referred to as a passive magnetic coupling system, whereas alternate methods that include the use of electro magnets, or similar controllable magnetic systems, are referred to as active magnetic systems.

In certain embodiments, the compressor system 10 may include a cooling system for the compressor unit 16, or the magnetic coupler 12, and/or other components. For example, the cooling system may include a gas (e.g., air) cooling system, a liquid (e.g., water) cooling system, a vapor compression cycle system, or another suitable cooling system. The cooling system may include a coolant path through, inside, and/or outside of the compressor unit 16 and/or the magnetic coupler 12. In certain embodiments, the cooling system has a closed loop coolant path, such that a liquid or gas absorbs heat from the compressor unit 16 and/or the magnetic coupler 12 and emits the heat through one or more heat exchangers. For example, a liquid pump may circulate the coolant through the closed loop coolant path, and a fan may blow air across the heat exchanger. In other embodiments, the compressor system 10 may exclude a cooling system or rely on natural convective heat transfer. Thus, various embodiments may include or exclude a variety of cooling systems with the compressor system 10 and the magnetic coupler 12.

The end cap 124 enables coupling of the external rotor 110 to the first drive shaft portion 64. For example, in the illustrated embodiment, the end cap 124 includes an end cap bore 136 that accepts the driving end of the first drive shaft portion 64. In one embodiment, the driving end 116 of the first drive shaft portion 64 is coupled to the end cap bore 136 via an interference fit, a mechanical fastener, an adhesive, or the like. The end cap bore 136 includes a key slot 138 that aligns the first drive shaft portion 64 to the end cap bore 136, in one embodiment. Further, the key slot 138 may promote the transfer of torque from a complementary keying feature of the first drive shaft 64, in another embodiment. Although a single keying feature 138 is illustrated, any number of keying features 138 can be employed to provide for coupling to the end cap 124. The end cap 124 is typically secured to the body 122 via one or more mechanical fasteners, an interference fit, an adhesive, or the like.

Although the end cap 124 is illustrated as a separate component that is secured to the body 122, other embodiments may include integrally forming the end cap 124 as a portion of the body 122, the first drive shaft portion 64, or both. For example, in one embodiment, the external rotor 110 includes a cup-shaped body that includes the end cap 124. In another embodiment, the end cap 124 is formed as a flange on the end of the first drive shaft portion 64. In yet another embodiment, the external rotor 110 (e.g., the body 122 and the end cap 124) is formed integral to (e.g., as a part of) the first drive shaft portion 64.

The internal rotor 112 generally includes a cylindrical shaped body 140 coupled to the driven end 118 of the second drive shaft portion 66. For example, the second drive shaft portion 66 is coupled to the internal rotor 112 via an impeller drive shaft hole 142 that extends at least partially into the body 140 of the internal rotor 112. In some embodiments, the second drive shaft portion 66 is coupled to the impeller drive shaft hole 142 via an interference fit, mechanical fasteners, an adhesive, or the like. Although the illustrated embodiment includes the second drive shaft portion 66 and the internal rotor 112 formed from separate components that are secured to one another, another embodiment includes the second drive shaft portion 66 formed integrally with the internal rotor 112. For example, in one embodiment, the internal rotor 140 includes the body 142 formed with the second drive shaft portion 66 extending therefrom.

The internal rotor 112 generally includes one or more magnetic devices 144 distributed about the exterior of the internal rotor 112. In the illustrated embodiment, the internal rotor 112 includes an additional cover 146 disposed over the magnetic devices 144. The cover 146 generally provides for protecting the magnetic devices 144 from debris or other substances that may react with and/or become lodged within the magnetic devices 144. For example, the cover 146 includes, in one embodiment, a sealed housing over the exterior of the internal rotor 112 and the magnetic devices 144 to help to reduce the likelihood of corrosive gas contacting the magnetic devices 144 and/or help prevent debris from becoming lodged proximate the magnetic devices 144. In certain embodiments, a variety of protective devices may be used to block particles from reaching and detrimentally affecting the magnetic devices 130 and 144 and the magnetic coupler 12 as a whole.

As depicted, when the magnetic coupler 12 is assembled, the magnetic devices 144 of the internal rotor 112 are generally complimentary to the magnetic devices 130 of the external rotor 110. During operation, the magnetic devices 144 exhibit a magnetic field that couples the internal rotor 112 to the external rotor 110. In one embodiment, the magnetic devices 144 include one or more hub magnets. The hub magnets generally include permanent magnets that generate a static (e.g., passive) magnetic field. In one embodiment, the permanent magnets include rare-earth magnets such as samarium-cobalt (SmCo17), neodymium ferric boron (NdFeB), or the like. In another embodiment, the magnetic devices include one or more active magnetic devices 144 composed of coils or similar devices that are energized to generate the magnetic field.

In an embodiment that includes a Passive/Passive arrangement, the magnetic devices 130 and 144 of the external rotor 110 and the internal rotor 112 employ passive magnetic devices (e.g., permanent magnets). In an embodiment including an Active/Passive arrangement, the internal rotor 112 employs passive magnetic devices 144 (e.g., permanent magnets) and the external rotor 110 employs active magnetic devices 130 (e.g., electromagnets), or vise versa. In an Active/Active the magnetic devices of the external rotor 110 and the internal rotor 112 both employ active magnetic devices (e.g., electromagnets). In certain embodiments, the magnetic coupler 12 may include any combination of active and/or passive magnets for the magnetic devices 130 and 144. For example, the magnetic coupler 12 may include a passive/passive, passive/active, active/passive, or active/active arrangement of magnets in the magnetic devices 130 and 144.

Turning now to the arrangement of the magnetic devices 130 and 144 within the magnetic coupler 12, the illustrated embodiment includes a Cylindrical/Cylindrical arrangement of the magnetic devices 130 and 144. The Cylindrical/Cylindrical arrangement is characterized by the concentric arrangement of the magnetic devices 130 and 144 that includes the magnetic devices 144 of the internal rotor 112 disposed in a first ring like configuration that is nested inside the magnetic devices 130 of the external rotor 110. Magnetic coupling is achieved via the magnetic devices 130 and 144 located on the internal surface of the external rotor 110 and magnetic devices 130 disposed on the external surface of the internal rotor 112. In certain embodiments, the magnetic devices 144 of the internal rotor 112 and the magnetic devices 130 of the external rotor 110 are arranged in a nested configuration either inside/outside or outside/inside relative to one another. The magnetic devices 144 may be disposed inside, outside, or integrally within the internal rotor 112, and the magnetic devices 130 may be disposed inside, outside, or integrally within the external rotor 110. In certain embodiments, the rotors 110 and 112 and the magnetic coupler 12 may have a cylindrical or non-cylindrical geometry, such as an oval shape nested within an oval shape. Thus, the magnetic coupler 12 is not limited to any particular geometry or configuration.

Figure 5A:
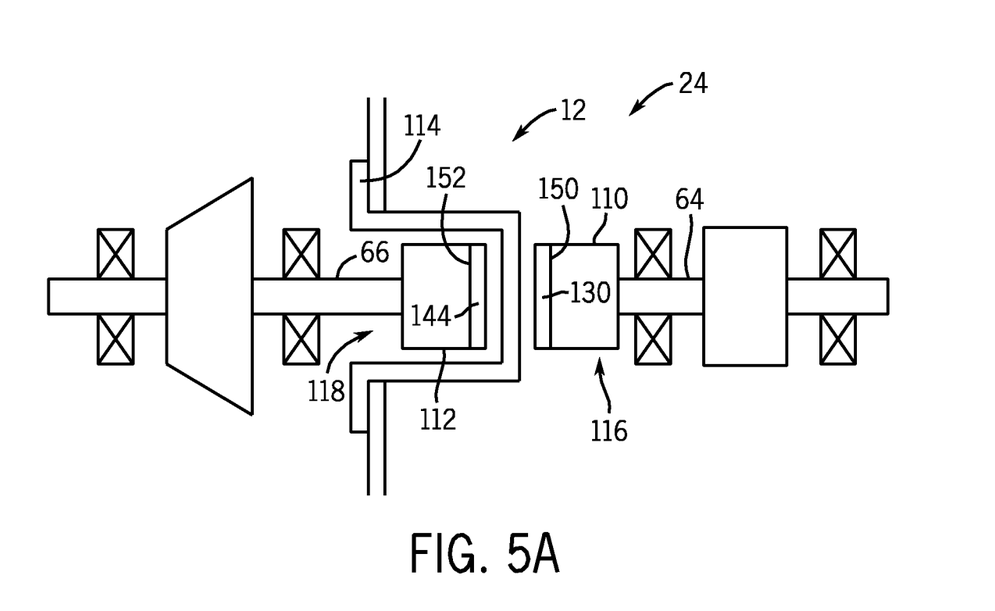
FIGS. 5A-5B are block diagrams depicting various embodiments of magnetic devices within the magnetic coupler.

FIG. 5A illustrates another embodiment of the magnetic coupler 12 that includes a Face/Face arrangement of the magnetic devices 130 and 144. In the illustrated embodiment, the magnetic devices 130 and 144 are disposed on opposing ends of the first drive shaft portion 64 and the second drive shaft portion 66. For example, the magnetic devices 130 are disposed on a face 150 of the rotor 110 coupled to driving end 116 of the first drive shaft portion 64, and the complementary magnetic device 144 is disposed on an opposing face 152 of the rotor 112 coupled to the driven end 118 of the second drive shaft portion 66, wherein each face is generally perpendicular to the drive axis 62.

Figure 5B:
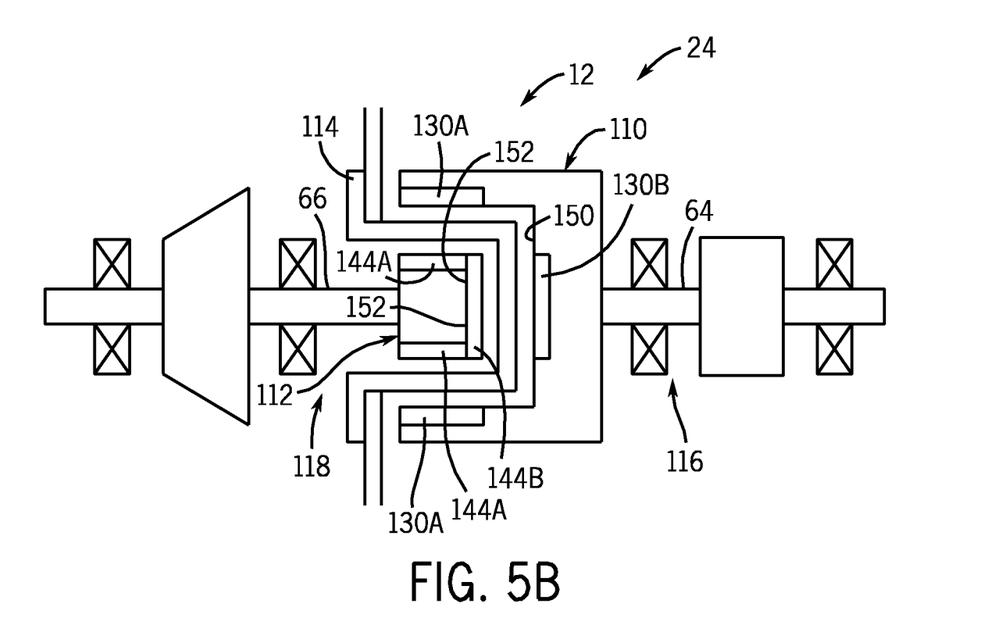

FIG. 5B illustrates another embodiment of the magnet coupler 12 that includes a combination of the Cylindrical/Cylindrical arrangement and the Face/Face arrangement. In the illustrated embodiment, the external rotor 110 includes magnetic devices 130A and 130B, and the internal rotor 112 includes magnetic devices 144A and 144B. The magnetic devices 130A are disposed on the interior of the rotor 110 and are complementary to the magnetic devices 144A disposed on the circumference of the internal rotor 112. The magnetic devices 130B are disposed on the face 150 of the external rotor 110 and that are opposite and complementary to the magnetic devices 144B disposed on a face of the internal rotor 112. In operation, each set of magnetic devices (e.g., cylindrical and face magnetic devices) are magnetically coupled to one another and are configured to transfer torque from one shaft to the other. For example, rotational torque may be delivered from the first drive shaft portion 64 to the second drive shaft portion 66 via both sets of magnetic devices 130A, 130B, 144A and 144B located on the driving end 116 and the driven end 118 of the first drive shaft portion 64 and the second drive shaft portion 66, respectively.

Returning now to FIG. 4, the magnetic coupler 12 also includes the containment shroud 114 that separates the external rotor 110 and the internal rotor 112. In the illustrated embodiment, the containment shroud 114 includes the cup-shaped protrusion 120 that extends toward the drive side 58 of the stage 24 when installed (see FIGS. 2 and 3). As discussed above, with reference to FIG. 4 the external diameter 134 of the protrusion 120 is less than the internal diameter 132 of the external rotor 110, and the internal diameter 158 is larger than the external diameter of the internal rotor 112. In operation, neither the external rotor 110 nor the internal rotor 112 contacts the containment shroud 114. Instead, a small gap exists between the containment shroud 114 and the exterior of each of the rotors 110 and 112, thereby enabling the rotors 110 and 112 to rotate without contacting the containment shroud 114. The gap between the containment shroud 114 and the rotors 110 and 112 is typically minimized to promote magnetic coupling of the magnetic devices 130 and 144, while reducing friction and the potential for heat build-up. Accordingly, the containment shroud 114 and the gap act to insulate the internal rotor 112 and the external rotor 110. Further, the protrusion 120 includes a depth 160 that is greater than a width 162 of the external rotor 110 and a width 163 of the internal rotor 112. Accordingly, in one embodiment, the external rotor 110 and the internal rotor 112 can be approximately aligned in a direction transverse to the drive axis 62 when the external rotor 110, the internal rotor 112 and the containment shroud 114 are assembled.

The containment shroud 114 also includes, in the illustrated embodiment, a flange 164 that extends around an open end 166 of the containment shroud 114. In one embodiment, the flange 164 has an external flange diameter 166 that is greater than the external diameter 134 of the protrusion 120, and that is greater than a diameter of a drive shaft bore 115 (see FIG. 2) in the housing 92. Accordingly, in such an embodiment, when the containment shroud 144 is slid into the drive shaft bore 115, the flange 164 abuts the wall 106 of the housing 92 (see FIG. 2).

In some embodiments, the flange 164 is secured to the housing 92 to provide a hermetic seal between the drive side 58 and the driven side 60 of the stage 24. In one embodiment, the flange 164 is mechanically coupled to the housing 92 to create a barrier that helps to block gas or similar substances from passing between the compression chamber 98 and the drive side 58 of the stage 24, for instance. The flange 164 may be fastened via rivets, a threaded fastener, or similar device. In other embodiments, the interface between the housing 98 and the flange 164 includes one or more sealing elements that help to block gases from leaking out of the housing. For example, in one embodiment, a gasket, or similar sealing device, or substance, is disposed between the flange 164 and the housing 98 to reduce the likelihood that gas can pass between the driven side 60 and the drive side 58 of the stage 24.

Accordingly, in some embodiments, the shroud 114 isolates the two shaft portions 64 and 66 and creates a static seal, rather than a rotating seal that is typical of a shaft rotating within a bore. Thus, the shroud 114 more effectively blocks fluid exchange between the either sides of the bore 167, thereby effectively sealing the drive side 58 from the driven side 60.

As mentioned briefly above, the bearings 86 and 94 of the drive system 52 and the compressor scroll 54 may include any suitable bearing to provide axial and/or radial support of the rotating shafts. Further, the quantity and arrangements of the bearings 86 and 94 may be varied to suit particular applications.

Figure 6A:
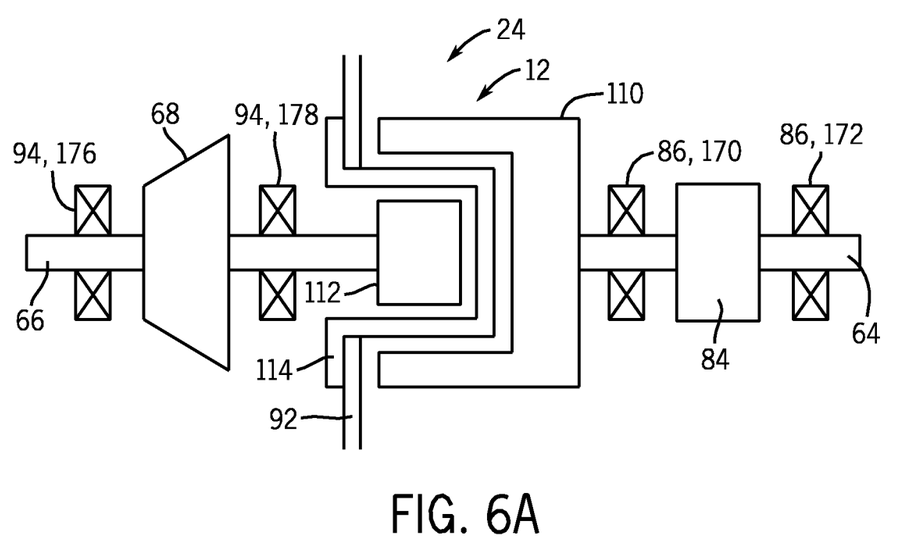
FIGS. 6A-6C are block diagrams depicting various embodiments of a stage of the compressor system.
Figure 6B:
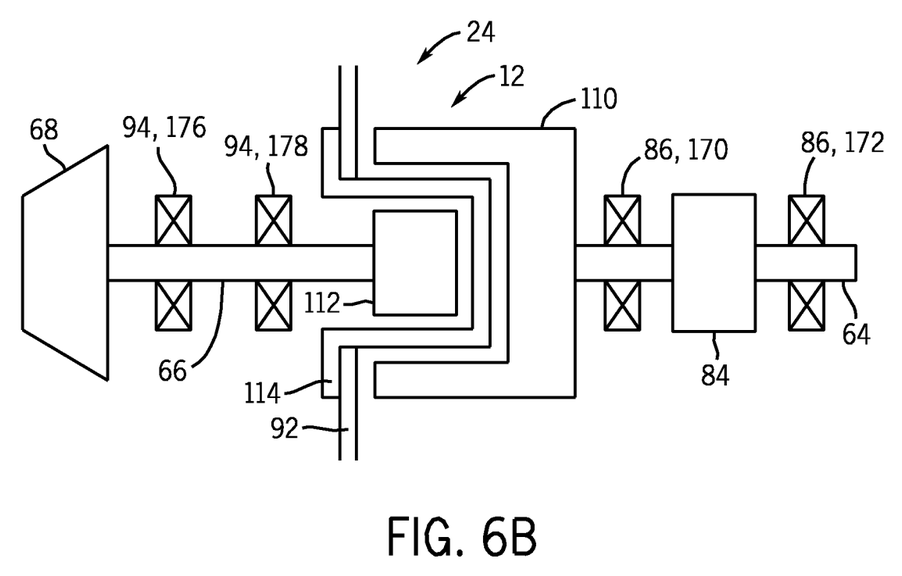
Figure 6C:
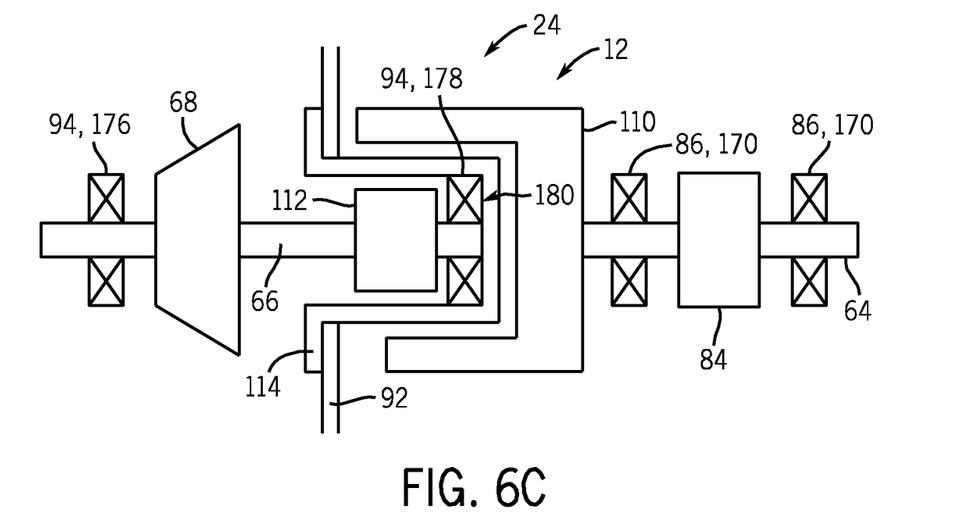

Turning now to FIGS. 6A-6C, multiple embodiments of the stage 24 are depicted. FIG. 6A is a schematic diagram of the stage 24 illustrated in FIGS. 2 and 3. More specifically, FIG. 6A includes two drive shaft bearings 86 that straddle the drive region 84, and two impeller shaft bearings 94 that straddle the impeller 68. The term straddle may be defined as including a bearing located on either side of the drive region 84 and/or the impeller 68. For example, in the illustrated embodiment, a first drive bearing 170 is located between the external rotor 110 and the drive region 84, and a second drive bearing 162 is located on the opposite side of the drive region 84 from the first drive bearing 170. Further, a first impeller bearing 176 is located in front of the impeller 68 and a second impeller bearing 178 is located behind the impeller 68 (e.g., on a side of the impeller 68 that is opposite the first impeller bearing 176). In other words, the first impeller bearing 176 is located proximate the inlet 96 and the second impeller bearing 178 is located between the impeller 68 and the magnetic coupler 12. In certain embodiments, any arrangement of bearings may be employed in combination with the magnetic coupler 12.

Turning now to FIG. 6B, another embodiment of the stage 24 including a different arrangement of the bearings is illustrated. Similar to the embodiment of FIG. 6A, the embodiment of FIG. 6B includes two drive bearings 86 that straddle the drive region 84. However, in the embodiment of FIG. 6B, the two impeller bearings 94 are located behind the impeller 68. In other words, two impeller bearings 94 are located between the impeller 68 and the magnetic coupler 12 (i.e., inboard). Although the illustrated embodiment includes the two impeller bearings 94 located behind the impeller 68 other embodiments may include any number of impeller bearings 94 located between the impeller 68 and the magnetic coupler 12. It is also noted that, in the illustrated embodiment, no impeller bearing 94 is located in front of impeller 68. In other words, no impeller bearing 94 is located on the side of the impeller 68 proximate the inlet 96. In another embodiment, the two impeller bearings 94 may be located in an outboard position relative to the impeller 68. In other words, the two impeller bearings 94 may be disposed to the left of the impeller 68 in FIG. 6B, rather than to the right of the impeller 68 between the impeller 68 and the magnetic coupler 12.

Turning now to FIG. 6C, another embodiment of the stage 24 is depicted. Similar to the arrangement of FIG. 6A and FIG. 6B, the drive bearings 86 straddle the drive region 84. However, once again, the impeller bearings 94 include an alternate arrangement. In the illustrated embodiment, the first impeller bearing 176 is located in front of the impeller 68 and the second impeller bearing 178 is disposed integral to the containment shroud 114. More specifically, the second impeller bearing 178 is located internal to the containment shroud 114 proximate a closed end 180 of the containment shroud 114. In one embodiment, the second impeller bearing 178 or another impeller bearing 94 may be disposed between the impeller 68 and the internal rotor 112. Further, in one embodiment, the impeller bearing 178 is physically integrated with the containment shroud 114. In another embodiment, the impeller bearing 178 is a separate component from the containment shroud 114 and is subsequently assembled to the containment shroud 114. Further, although the illustrated embodiment includes a single bearing 94 on either side of the impeller 68, other embodiments may include any number of impeller bearings 94 disposed on either side of the impeller 68. For example, one or more bearings may be located on the front side of the impeller 68 and one or more bearings may be located on the back side of the impeller 68 and/or internal to the containment shroud 114.

Figure 7:
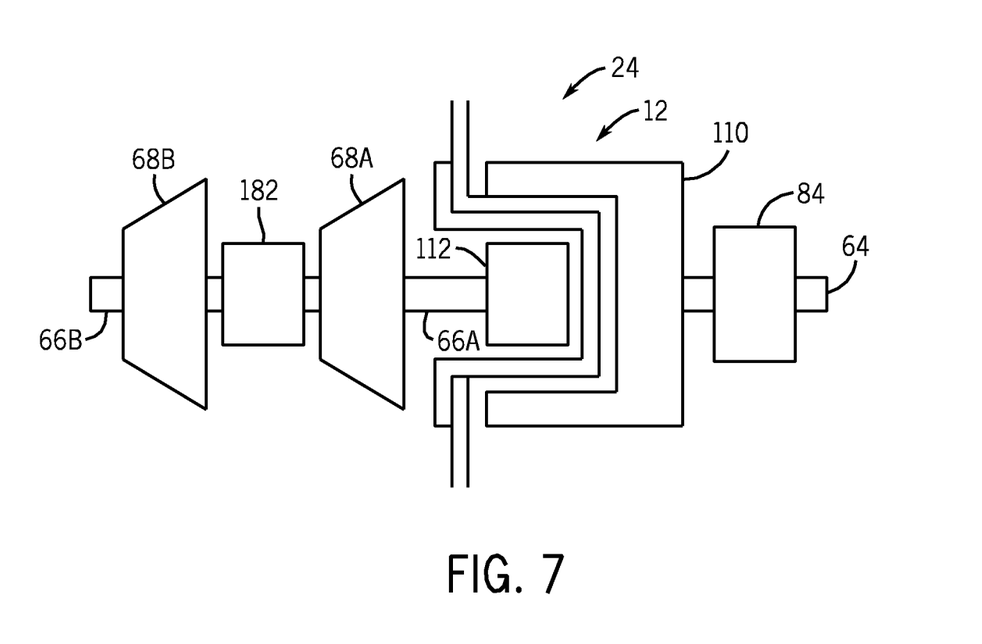
FIG. 7 is a block diagram depicting an embodiment of the stage of the compressor system including multiple impellers.

Although the above discussed embodiments include a single impeller 68 coupled to the impeller drive shaft 66, other embodiments may include multiple impellers 68 coupled to the impeller drive shaft 66. For example, FIG. 7 illustrates an embodiment including multiple impellers 68 coupled to the impeller drive shaft 66. More specifically, in the illustrated embodiment, the impeller drive shaft 66 includes a first impeller 68A coupled to a first impeller drive shaft portion 66A proximate the magnetic coupler 12, and a second impeller 68B coupled to a second impeller drive shaft portion 66B. In the illustrated embodiment, the a first impeller drive shaft portion 66A, including the first impeller 68A, is coupled to the pinion drive shaft portion 64 via the magnetic coupler 12, and the second impeller drive shaft portion 66B is coupled to the first impeller drive shaft portion 66A via second a coupler 182. The second coupler 182 is configured to transfer rotational torque from the first impeller drive shaft portion 66A to the second impeller drive shaft portion 66B. The second coupler 182 may include any device configured to transfer torque from the first impeller drive shaft portion 66A to the second impeller drive shaft portion 66B. For example, in one embodiment, the coupler 182 includes a magnetic coupler, similar to the previously discussed magnetic coupler 12.

In the various embodiments discussed above, the magnetic coupler 12 is generally coupled to at least one rotating component having at least one impeller. As appreciated, any combination or configuration of one or more magnetic couplers 12, impellers, and shafts are within the scope of the present embodiments. For example, one embodiment may employ a multitude (e.g., 2, 3, 4, 5, or more) of impellers at a first end, a second end, a middle region, or a combination thereof, along with one or more magnetic couplers. By further example, one or more bearings may be disposed outboard, inboard, or a combination thereof, with respect to the impeller and magnetic coupler. By further example, one or more magnetic couplers may be disposed outboard, inboard, or a combination thereof, with respect to the impeller and other components of the rotating equipment. In one embodiment, the drive shaft and driven shaft (e.g., 64 and 66) each include one or more impellers and one or more magnetic couplers. In another embodiment, a series of shafts and/or impellers are arranged in series, and are coupled together via magnetic couplers. In such an embodiment, each shaft may include 0, 1, 2, 3, 4, 5, or more impellers and associated magnetic couplers. In summary, the configuration and number of impellers, magnetic couplers, and rotating components is not limited to any particular set up.

Figure 8:
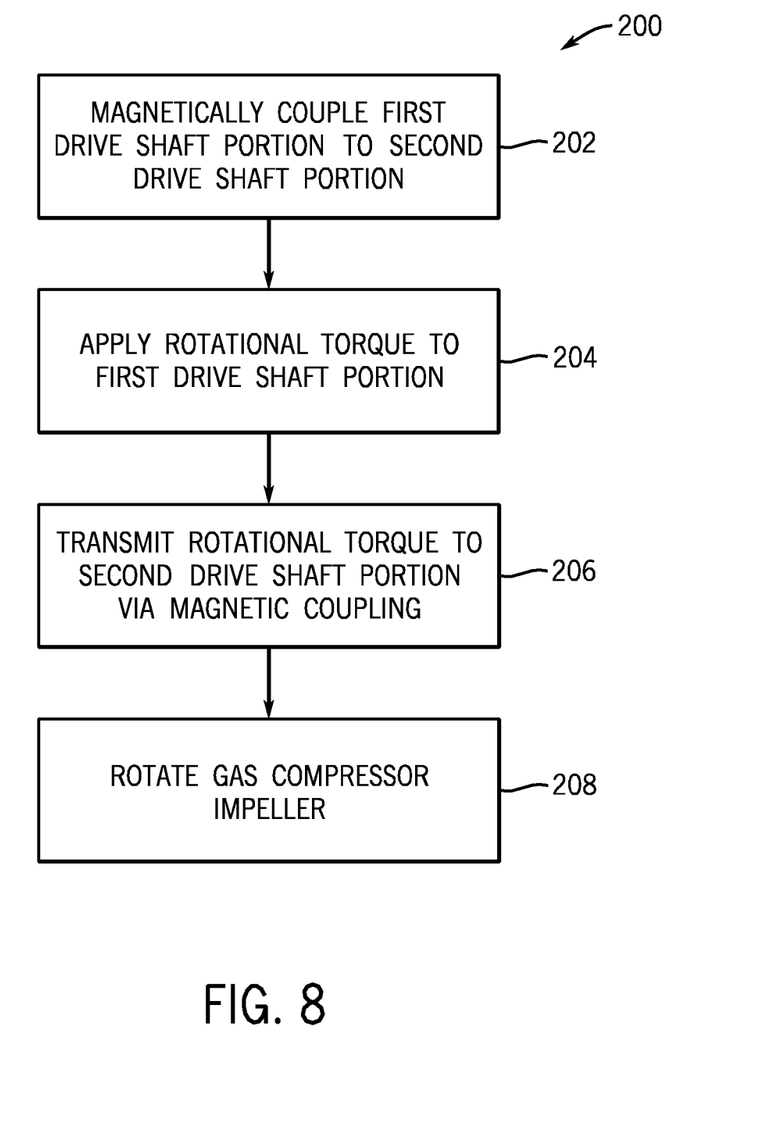
FIG. 8 is a flowchart illustrating an embodiment of a method of operating the compressor system.

FIG. 8 is a flowchart that illustrates a method 200 in accordance with the presently disclosed techniques. More specifically, the method 200 includes magnetically coupling a first drive shaft portion to a second drive shaft portion, as depicted at block 202. In one embodiment, this includes employing any one of the techniques discussed above to magnetically couple the first drive shaft portion 64 (e.g., the pinion drive shaft) to the second drive shaft portion 66 (e.g., the impeller drive shaft). Further, the method 200 includes applying a rotational torque to the first drive shaft portion, as depicted at block 204. In one embodiment, this includes applying a rotational torque to the drive shaft 56 via an indirect drive system, a direct drive system, or a similar drive system, as discussed above. The method 200 also includes transmitting the rotational torque to the second drive shaft portion via magnetic coupling, as depicted at block 206. In one embodiment, this includes the magnetic coupler 12 transmitting torque via a first rotor (e.g., the external rotor 110) to a second rotor (e.g., the internal rotor 112) of the magnetic coupler 12. Accordingly, the method includes coupling the first drive shaft portion 64 to the second drive shaft portion 66 without any mechanical/physical connection between the shaft portions 64 and 66, in some embodiments. It is further noted that employing magnetic coupling in accordance with the previously discussed embodiments is configured to transmit a torque across a sealed barrier (e.g., the containment shroud 114) and is configured to prevent gas from leaking out of the housing 92 containing the impeller 68 or similar device. Finally, the method 200 includes rotating a gas compressor impeller, as depicted at block 208. In one embodiment, this includes transmitting the rotational torque from magnetic coupler 12 to one or more impellers 68 via the one or more drive shaft portions (e.g., drive shaft portions 66, 66A and 66B). Although the illustrated embodiment includes a specific embodiment of the method 200, the method 200 may include variations to implement one or more of the embodiments discussed above. For example, additional steps may be implemented in an embodiment that includes a second magnetic coupler configured to couple the second impeller drive shaft portion 66B to the first impeller drive shaft portion 66A.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A system, comprising:
a gas compression system, comprising:
a drive housing comprising:
a drive unit shaft;
a drive shaft;
a gear with gear teeth geared to the drive unit shaft or the drive shaft wherein the gear is configured to transfer rotational energy from the drive unit shaft to the drive shaft;
a gas compressor, comprising:
a compressor housing directly coupled to the drive housing at an interface, the compressor housing comprises:
an impeller drive shaft magnetically coupled to the drive shaft through a first pair of axially opposed magnets and a second pair of radially offset and circumferentially opposed magnets, the impeller drive shaft including one magnet of the first pair and one magnet of the second pair, and the drive shaft including the other magnet of the first pair and the other magnet of the second pair;
an impeller coupled to the impeller drive shaft; and
a shroud disposed between the impeller drive shaft and the drive shaft, wherein the shroud isolates a first volume in the drive housing from a second volume in the compressor housing.

2. The system of claim 1, wherein the first pair of magnets and the second pair of magnets define a magnetic coupler.

3. The system of claim 2, wherein the magnetic coupler comprises a first rotor coupled to the drive shaft and a second rotor coupled to the impeller drive shaft.

4. The system of claim 2, comprising a cooling system configured to cool the magnet coupler, wherein the magnetic coupler magnetically couples the impeller drive shaft with the drive shaft.

5. The system of claim 2, wherein at least one cover extends over at least one of the magnet of the first pair or the magnet of the second pair to provide protection against contamination.

6. The system of claim 3, wherein the first rotor comprises an external rotor and the second rotor comprises an internal rotor.

7. The system of claim 3, wherein the first rotor and the second rotor comprise passive magnets.

8. The system of claim 3, wherein the first rotor, the second rotor, or both, comprise an active magnet.

9. The system of claim 3, wherein the first rotor and the second rotor comprise magnetic devices that face each other along a rotational axis of the drive shaft and the impeller drive shaft.

10. The system of claim 3, wherein the first rotor comprises a first arrangement of one or more magnets, the second rotor comprises a second arrangement of one or more magnets, and the first and second arrangements are coaxial with one another.

11. The system of claim 10, wherein the first and second arrangements are generally circular.

12. The system of claim 10, wherein the first and second arrangements are non-circular or oval.

13. The system of claim 1, wherein the impeller is coupled to a first end of the impeller drive shaft and a rotor coupled to a second end of the impeller drive shaft, wherein the as impeller is disposed on a driven side of a stage of the gas compressor and the rotor is disposed internal to a protrusion.

14. The system of claim 1, wherein the impeller drive shaft is a first impeller drive shaft, wherein the gas compressor comprises a first impeller coupled to the first impeller drive shaft, and a second impeller coupled to a second impeller drive shaft, wherein the second impeller drive shaft is magnetically coupled to the first impeller drive shaft.

15. The system of claim 1, comprising the impeller coupled to the impeller drive shaft, wherein the impeller is configured to be rotated at a speed between 15,000 revolutions per minute and 75,000 revolutions per minute.

16. The system of claim 1, comprising a bearing disposed inside of a protrusion of the shroud, wherein the bearing is coupled to the impeller drive shaft.

17. The system of claim 1, wherein the shroud comprises a protrusion that extends into the drive housing.

18. The system of claim 1, comprising a bearing physically integrated into the shroud and configured to support the impeller drive shaft.

19. A system, comprising:
a drive system, comprising:
a drive housing;
a drive disposed in the drive housing; and
a drive shaft coupled to the drive;
a gear with gear teeth disposed between the drive and the drive shaft, wherein the gear is configured to indirectly transmit torque between the drive and the drive shaft;
an impeller system, comprising:
an impeller housing directly coupled to the drive housing;
an impeller drive shaft;
an impeller magnetic rotor comprising an internal rotor coaxially nested inside of an external rotor, the internal rotor including a first internal magnet located on an axial end face as well as a second internal magnet located on a circumferential face configured to rotate about the coaxial axis, the external rotor including a first external magnet located on an opposing axial end face from the internal rotor as well as a second external magnet located on a circumferential face located radially outward of the second internal magnet, wherein the internal rotor magnetically couples directly to the external rotor, wherein the impeller magnetic rotor is coupled to the impeller drive shaft; and a gas impeller coupled to the impeller drive shaft; and a containment shroud that separates the impeller drive shaft from the drive shaft, wherein the impeller magnetic rotor is magnetically coupled to the drive shaft via a magnetic force through the containment shroud, wherein the containment shroud comprises a protrusion that extends into the drive housing, wherein the containment shroud seals a first volume of the drive housing from a second volume of the impeller housing.

20. The system of claim 19, comprising:

the drive system, comprising:

the drive shaft; and the impeller magnetic rotor coupled to the drive shaft.

21. A system, comprising:

a centrifugal gas compressor, comprising:

a drive system comprising:

a drive housing;

a drive shaft within the drive housing and coupled to a gearing, wherein the drive shaft is supported by one or more drive bearings, and wherein the gearing is configured to convey mechanical power to the drive shaft;

an impeller system, comprising:

an impeller housing coupled to the drive housing at an interface;

an impeller drive shaft supported by one or more impeller bearings;

a gas impeller coupled to the impeller drive shaft;

a magnetic coupler, comprising:

a first rotor comprising a first axial face with a first magnetic device and a first circumferential face structured to rotate about a first rotor axis, wherein the first rotor is coupled to the drive shaft;

a second rotor comprising a second axial face with a second magnetic device opposing the first axial face of the first rotor, the second rotor also comprising a second circumferential face structured to rotate about the first rotor axis, wherein the second rotor is coupled to the impeller drive shaft, wherein the first axial face of the first rotor and the second axial face of the second rotor face one another and are magnetically coupled to one another axially, and wherein the first circumferential face and the second circumferential face are radially offset and magnetically coupled with one another; and a containment shroud disposed between the impeller drive shaft and the drive shaft wherein the containment shroud isolates a first volume in the drive housing from a second volume in the impeller housing, and wherein the containment shroud comprises a protrusion that extends away from the interface.

22. The system of claim 21, wherein the impeller system comprises another gas impeller coupled to another impeller drive shaft, wherein the other impeller drive shaft is magnetically coupled to the impeller drive shaft.

23. The system of claim 21, wherein the protrusion extends into the drive housing.

* * * * *